United States Patent
Hester et al.

(10) Patent No.: US 6,231,084 B1
(45) Date of Patent: May 15, 2001

(54) PLUG IN COUPLING FOR PRESSURE FLUID

(75) Inventors: Hilmar Hester; Bettina Schröer, both of Wipperfürth (DE)

(73) Assignee: Armaturenfabrik Hermann Voss GmbH & Co., Wipperfurth (DE)

( * ) Notice: Subject to any disclaimer, the term of this patent is extended or adjusted under 35 U.S.C. 154(b) by 0 days.

(21) Appl. No.: 09/030,342

(22) Filed: Feb. 25, 1998

(30) Foreign Application Priority Data

Feb. 25, 1997 (DE) .............................................. 197 07 371

(51) Int. Cl.[7] ...................................................... F16L 55/00
(52) U.S. Cl. ............................... 285/23; 285/81; 285/305; 285/307; 285/906
(58) Field of Search .............................. 285/307, 23, 305, 285/906, 81

(56) References Cited

U.S. PATENT DOCUMENTS 3,731,955 * 5/1973 Borsum et al. ...................... 285/307

FOREIGN PATENT DOCUMENTS

| 86404 | * | 1/1959 | (DK) | ................................... 285/307 |
| 0005865 | | 3/1984 | (EP) . | |
| 1810718 | * | 4/1993 | (RU) | ................................... 285/307 |
| WO9635906 | | 11/1996 | (WO) . | |

* cited by examiner

Primary Examiner—Dave W. Arola
(74) Attorney, Agent, or Firm—Harness, Dickey & Pierce, P.L.C.

(57) ABSTRACT

A plug-in coupling for systems involving pressurized media, where the coupling consists of two connector parts, a housing part (2) and a connector part (4). The connector part (4) can be inserted into a receiving opening (8) of the housing part (2), while it is being sealed, and when it is in a plugged-in condition, it can be locked in place and prevented from being released by means of a locking device (10). The locking device (10) includes a retaining element (12), which is supported on one side of one of the coupling parts, and which retaining element engages—while in the assembled state—a retaining groove (16) of the other coupling part by means of a form-fit or a form- and friction-fit. A release device (32) is provided in such a manner, that—starting from the assembled state—the retaining element (12) is brought into a release position by means of a further insertion of the connector part (4), in which position the retaining groove (16) is released and the connector part (4) can be removed from the receiving opening (8). The release device (32) is equipped with a sleeve-type locking bar (40), which is capable of relative movement, and which is to be used in conjunction with the retaining groove (16) in such a manner, that the retaining element (12), when it is in the release position, is brought into radial contact with a circumferential area (42) of the locking bar (40) and is thus held in the release position, and when the movement to remove the plug-in connector takes place, the retaining groove (16) is covered by the locking bar (40) and thus closed off in a radial direction from being engaged by the retaining element (12).

11 Claims, 10 Drawing Sheets

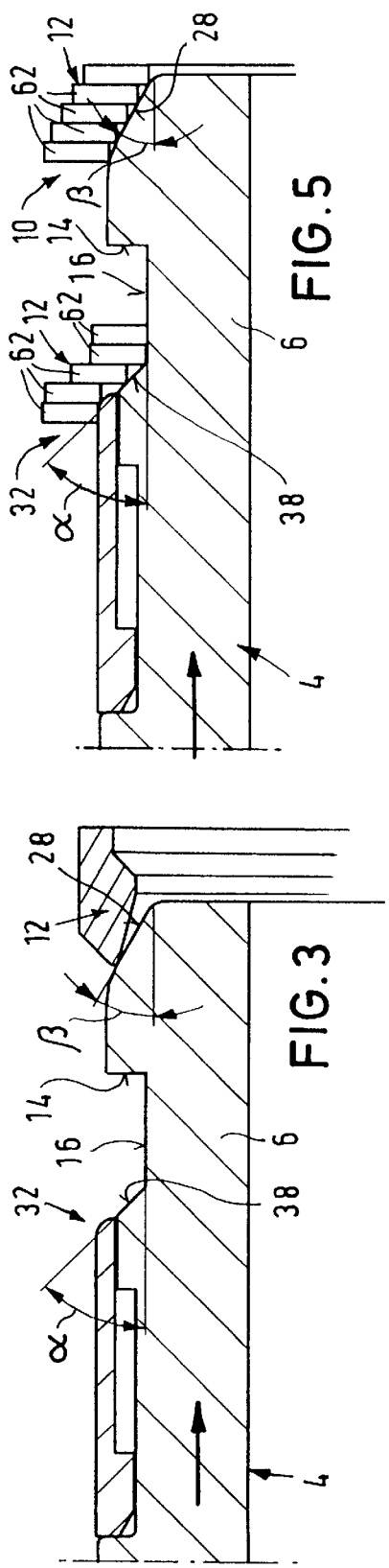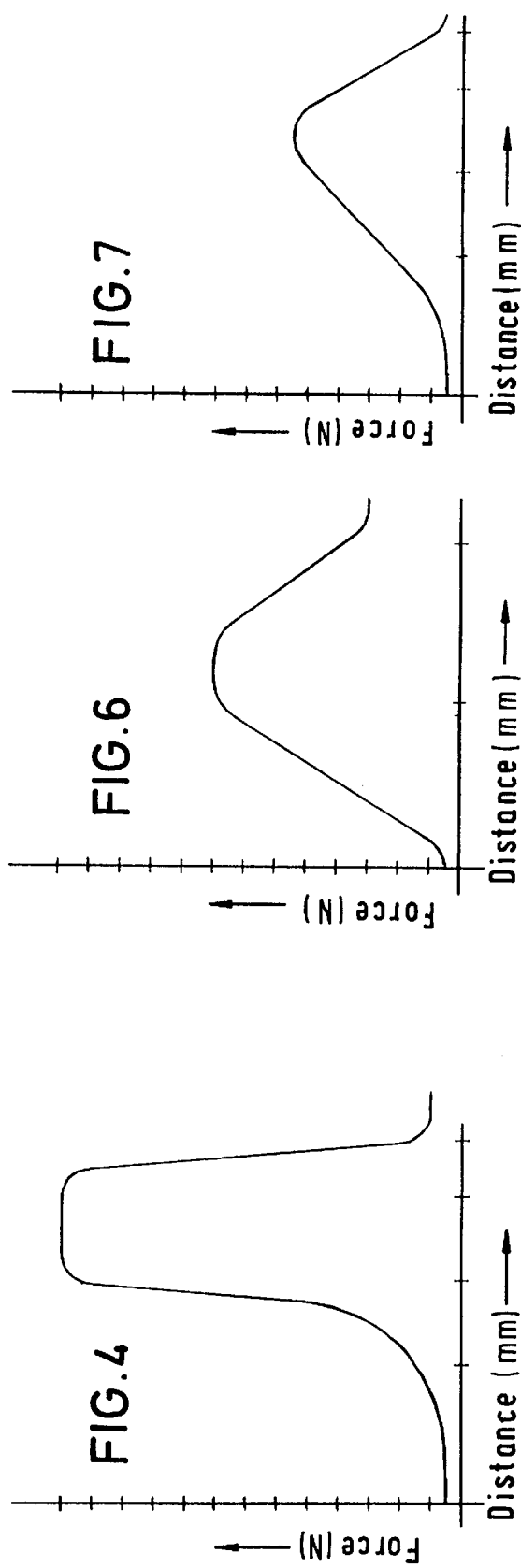

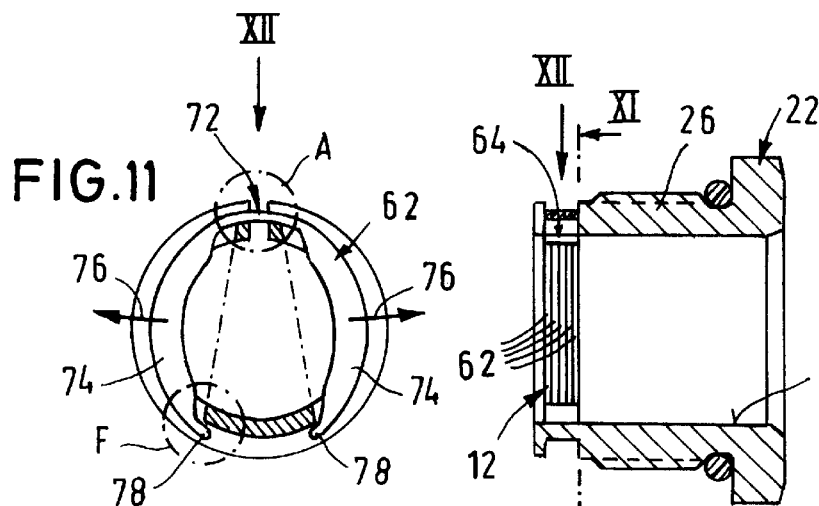
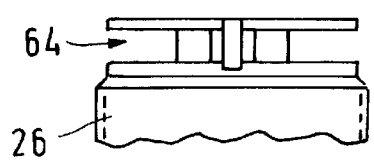
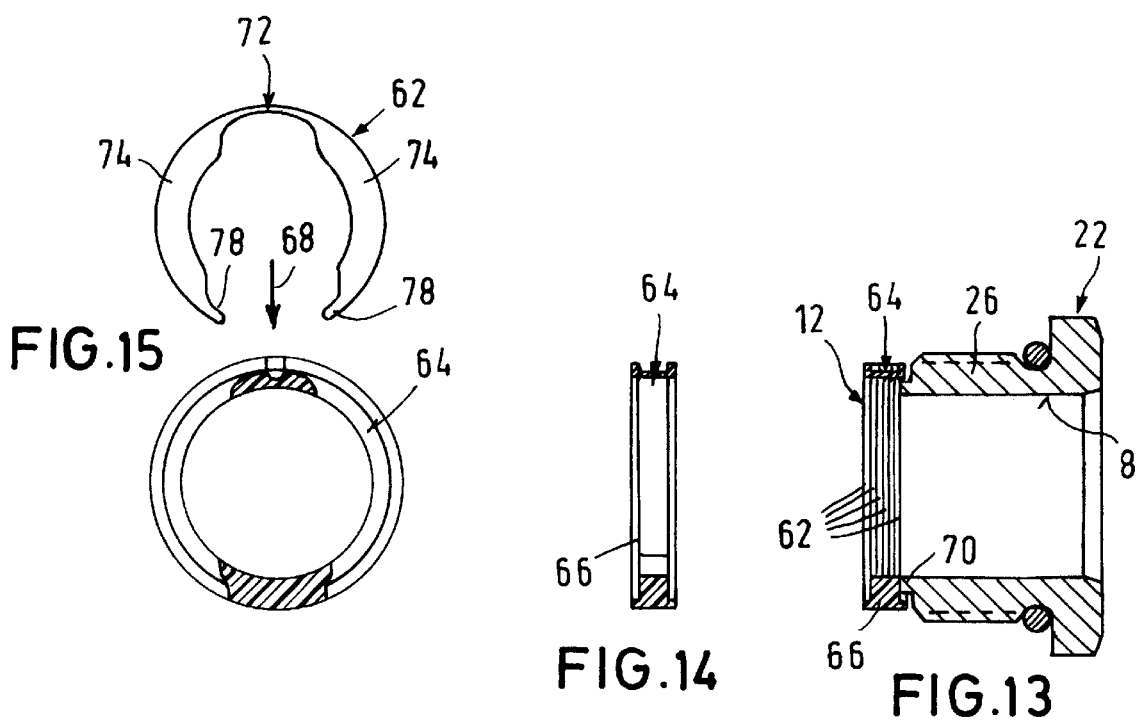

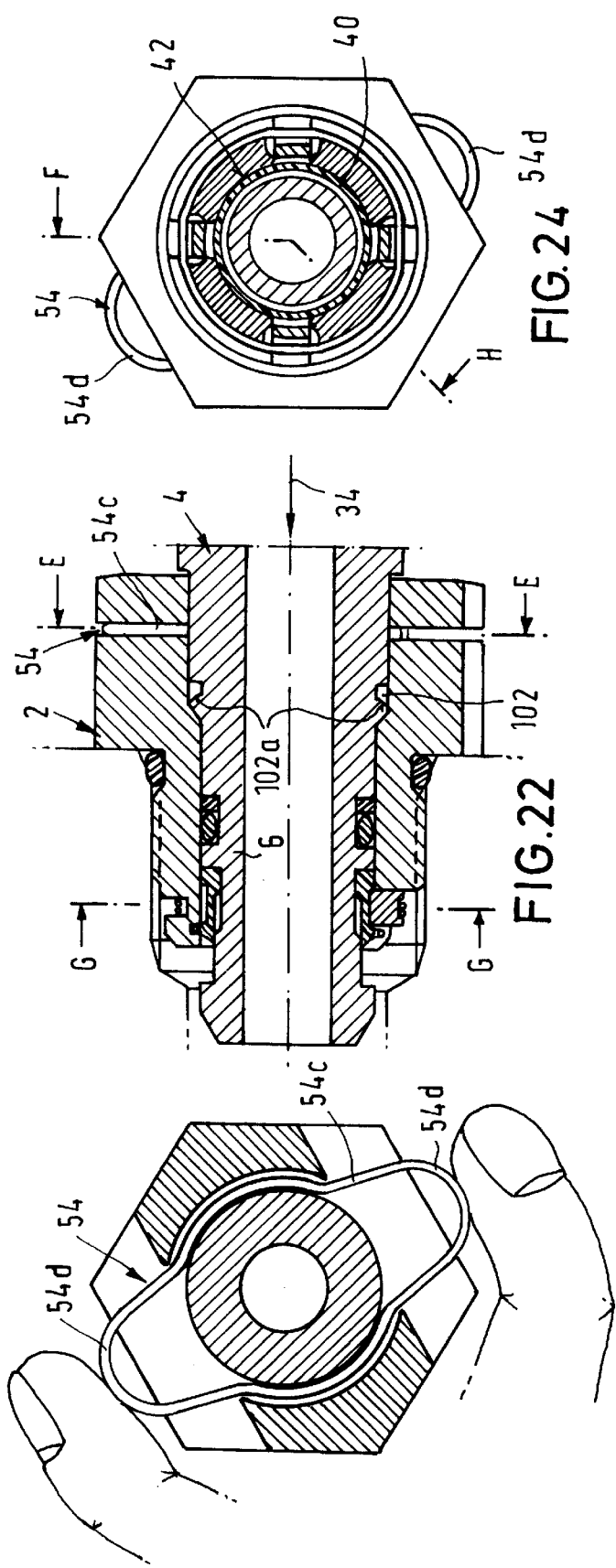

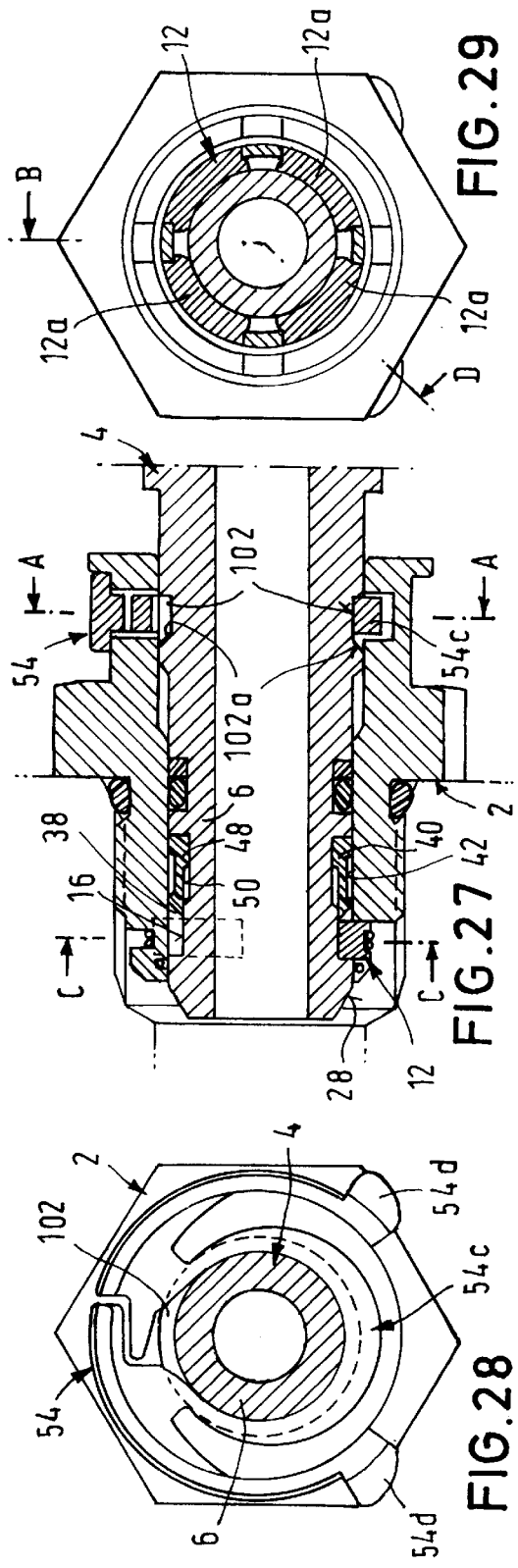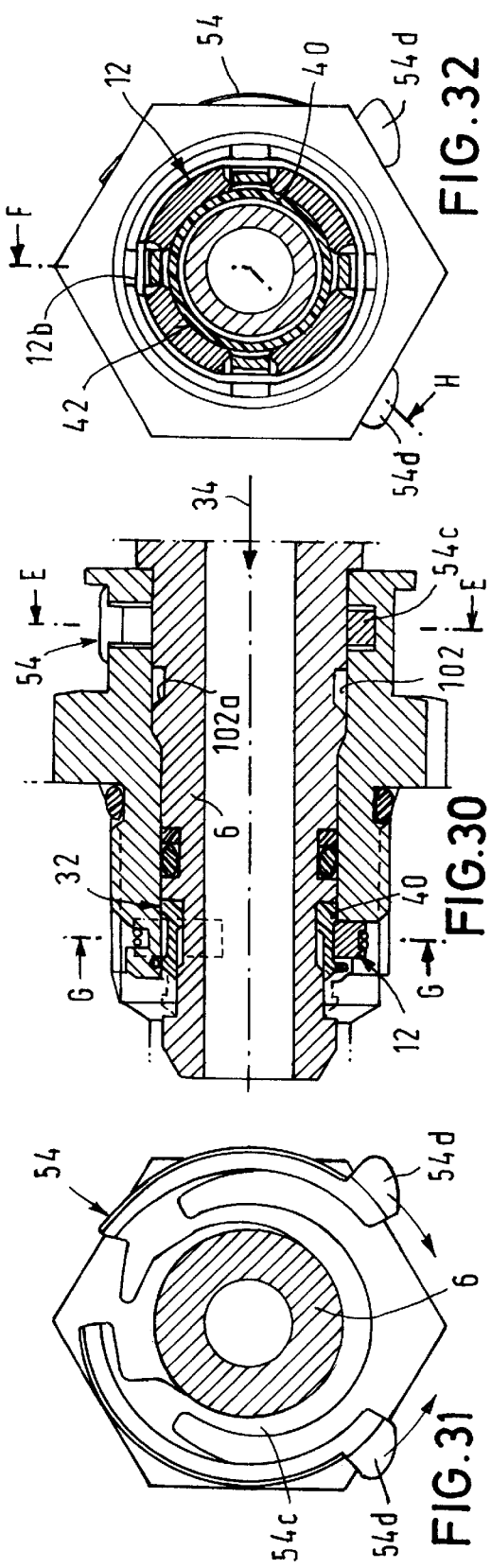

PLUG IN COUPLING FOR PRESSURE FLUID

BACKGROUND AND SUMMARY OF INVENTION

The present invention concerns a plug-in coupling for systems involving pressurized media, where the coupling consists of two parts, and more particularly of one housing part and one connector part. The connector part can be inserted into a receiving opening of the housing part, while it is being sealed, and when it is in a plugged-in assembled condition, it can be locked in place and prevented from being released by means of a locking device. The locking device includes a retaining element, which is supported on one side of one of the coupling parts, and, while in the assembled state, engages a retaining groove of the other coupling part by means of a form-fit or a form-and-friction-fit. A release device is provided in such a manner that, starting from the assembled state, the retaining element is brought into a release position by means of a further insertion of the connector part, in which position the retaining groove is released, and it is maintained in this position in such a manner that the connector part can be removed from the receiving opening.

Such a coupling is known from the WO-A-96/35906 or the parallel SE-C-503 937. Here the locking device includes several individual locking parts as a retaining element, which are distributed along the circumference and are located inside an inner circular groove of the housing or the bushing part (female connector), respectively, in such a manner, that they are always at an angle to the direction of insertion and tilted radially toward the inside and thus collectively generate a practically conical shape. In the region of the radially interior ends, the locking parts are surrounded by an elastic ring (O-ring), which ensures that the locking parts only engage a circular groove of the connector part with their radially interior "locking ends", in order to lock the connector in place and keep it from loosening. In order to facilitate a subsequent release, a ring is located inside the circular groove of the connector part, which has a radial thickness corresponding to the depth of the circular groove. Viewed from an axial direction, this ring has a length that is smaller than the width of the groove, so that it can be disposed inside the retaining groove in a manner allowing it to be shifted back and forth. Because of this ring it is possible to spread the locking parts outwardly by means of a further insertion movement of the connector; subsequently, they are caused to have their locking ends superimposed upon the ring. Subsequently, a release of the connector is, therefore, possible, because the locking parts are kept spread apart by the ring when the connector is pulled out. This known coupling is relatively complicated and expensive with respect to its design and its ability to be manufactured, because it consists of quite a number of individual parts. Above all, the individual locking parts, as compared with the elastic O-ring, require a special process for their assembly as well as a special assembly device (feeding head), by means of which the individual locking parts are inserted and held in place for such a time period until they practically hold each other in place.

Other types of plug-in couplings are sufficiently known from many publications; the GB-A-799 155 and the EP-B-0005 865 are mentioned here merely as examples. In the first-mentioned publication a coupling is described, where an elastic retaining ring is pre-installed in an outer circular groove at the connector part as a retaining element. Subsequently, the retaining ring, in the assembled condition and after the connector part has been inserted, engages an interior groove in the housing part. Here, a subsequent release of the plug-in coupling is no longer possible, because the retaining ring is not accessible from the outside, and, therefore, cannot be unlocked. The second publication mentioned above describes several embodiments of plug-in couplings, where an elastic retaining ring inside the housing part is supported in an annular chamber, and after it is inserted, it engages the groove of the outer ring of the connector, and in fact, it does so with its total thickness as measured in the axial insertion direction, so that a genuine form-fit is achieved. Because here the annular chamber receiving the retaining ring is generated between a housing part and a threaded part, which is connected to it in a manner that allows it to be released, a release is possible for this known coupling by removing the threaded part, and then removing the connector along with the retaining ring, which had been in engagement with the circular groove.

In the last described kind of couplings, the retaining element, which consists of one part and is radially elastic, can, of course, be assembled more simply and more quickly than would be possible with the multiplicity of locking parts in accordance with the first mentioned publication, which establishes its own particular type, according to which, however, the release of the connector part is simpler and more convenient.

The present invention is thus based on the task of creating a plug-in coupling, where the connector part can be released by especially simple and economical means with respect to its design and manufacturing or its assembly, and where a release of the connector part is possible in a simple and rapid manner with respect to its operation.

According to the invention, this is achieved in that the release device contains a sleeve-like locking bar for use with the retaining groove, which locking bar is located on the side of the connector part containing the retaining groove, and which is arranged in such a manner that it is relatively moveable, and which can be actuated by moving the connector part, where the locking bar is provided in such a manner, that the retaining element, when it is in the release position, is superimposed radially on a circumferential area of the locking bar, and is thus held in the release position, and when the movement to remove the connector takes place, it is moved into the region of the retaining groove in such a manner, that a radial engagement of the retaining element with the retaining groove is impossible. Thus, the retaining groove according to the invention can be completely closed off by an axial displacement of the locking bar, or it can be completely, i.e. across the entire axial width of the groove, opened. Therefore, it is advantageous that a retaining element can be used, especially one which is made of one piece and has radial elasticity, and which, in the assembled position, is engaged by the retaining groove along practically its entire length as measured in the axial direction, or its thickness, respectively, and where the axial thickness of the retaining element is about equal to or slightly smaller than the axial length or the width, respectively, of the retaining groove.

In order to release the connector part, the locking bar (according to the invention) of the release device can be actuated in a very convenient manner by movement of the connector part alone, which when compared to the disassembly of a threaded insert, can, of course, be accomplished very much more simply and quickly, especially so because no tool will be required any more. The release device according to the invention thus at first sees to it that the retaining element is unlocked, and after that, a renewed engagement of the retaining element in the retaining groove during a release movement is impossible.

In a preferred embodiment of the invention, it is initially contemplated that in order to unlock the retaining element, the retaining groove be bounded on one side by an inclined surface (conical surface) in such a manner, that by the continued insertion of the connector part the retaining element is plastically deformed by way of the inclined surface and thus brought into the release position. In order to avoid at this point, that during the subsequent release movement of the connector part (during which, of course, the retaining element must again pass by the retaining groove), the retaining element is engaged again by the retaining groove, the retaining element is superimposed on the locking bar, which is guided so as to be relatively moveable, so that the retaining element is held in the release position. During the movement of the withdrawal of the connector part, the locking bar is then displaced by way of the retaining member, which is connected to the locking bar at least by means of a friction-fit, but preferably by a friction- and form-fit, in such a manner, that the retaining groove is covered or closed-off to keep it from being engaged by the retaining element. In this way, the plug-in coupling can now be removed without hindrance.

If subsequently the connector part is to be inserted once again, the retaining groove will now be automatically opened again, because a relative rearward movement of the locking bar from the region of the retaining groove takes place. As far as the design is concerned, this is accomplished by means of a radial protrusion of the locking bar, whereby the retaining element, during the insertion, is moved into an axial contact with the front surface of the locking bar, and it is thus moved away with respect to the retaining groove. The locking bar is thus practically something "which can be actuated by a connector".

By virtue of the invention, it can be advantageously avoided to construct the housing part in two pieces, because in order to release it, no housing parts need to be disassembled any longer. However, for a simple assembly of the individual parts, which are essential for its correct operation, the housing part can continue to be constructed in two pieces, and in this case it is useful if it consists of a base part and a closure part, which is connected with it in such a way that it can be detached. The design of the closure part, however, is completely arbitrary. For example, it could consist of a male pipe fitting (in accordance with the initially mentioned EP-P-O 005 865). An essentially hollow cylindrical insert part may also be contemplated, which may be connected to the base part by other connecting means as an alternative to a screw coupling, for example, by a bayonet connection and/or a snap-in connection. Beyond this, a lid-like closure part, for example in the form of a flat closure plate, is possible (For a comparison see, for example, DE 39 25 293 C2). In every case, the important thing is only to limit a receiving chamber or the retaining groove, respectively, for the retaining element in an axial direction, so that a simple assembly and disassembly of the individual parts is possible. In this context, even a closure plate, for example, can be connected movably to the base part in such a manner, that, in a first position, the individual parts can be assembled or disassembled through a sufficiently large opening, and, in a second position, the opening can then be accordingly made smaller in such a way, that only the connector part can be plugged in or removed. Such an embodiment is known as such, for example, from the DE 38 10 385 A1.

In conjunction with the invention, i.e. in combination with the release device according to the invention, it is of particular advantage, if the retaining element consists of at least two individual elements, which when viewed in the direction of their insertion, are located one behind the other in such a manner, that during the insertion or the removal process, respectively, the individual elements are always deformed radially, one after the other, or they successively engage the retaining groove, one after the other. Preferably, the individual elements are fashioned in the form of lamella, as clamps, which can be elastically deformed in a radial direction, or as spring washers, in which case preferably two to six, especially five equally lamella-shaped individual elements are placed next to each other like a package. By means of this advantageous embodiment it is achieved, that for the actuation of the retaining element, i.e. for its radial elastic deformation, only a relatively small insertion force is required, whereas in the assembled position a very high holding force for the ability to sustain the interior system pressures is ensured. Details of this preferred embodiment are also contained in a separate EP-application of the same priority on the basis of the German patent application with the file number DE 197 07 372; this application will be fully referred to.

Further advantageous characteristics of the embodiments of the invention are contained in the dependent claims as well as in the subsequent description.

On the basis of the examples of the preferred embodiments and the designs illustrated in the drawings, the invention will now be described in more detail. The illustrations show the following:

BRIEF DESCRIPTION OF THE DRAWINGS

FIG. 3 is schematic presentation of a partial section in the area of the release device with a conventional, one-piece block-type retaining element.

FIG. 4 is related insertion-force diagram for the embodiment according to FIG. 3.

FIG. 5 is a schematic presentation analogous to that of FIG. 3, but with a novel multi-part retaining element.

FIG. 6 is an insertion force diagram for the release or the unlocking process, respectively, of the embodiment according to FIG. 5.

FIG. 7 is a corresponding insertion force diagram for the plug-in process of the embodiment to FIG. 5.

FIG. 10 is a separate section view of the example of an individual part of the plug-in coupling according to the invention and with respect to FIGS. 1 and 2 including the presentation of the retaining element.

FIG. 11 is cross section in the plane XI—XI according to FIG. 10.

FIG. 12 is a view in the direction XII of the arrow according to FIGS. 10 or 11 without a presentation of the retaining element.

FIG. 13 is a presentation analogous to FIG. 10 in a different version of an embodiment.

FIG. 14 is a section view of an individual part of the embodiment of FIG. 13.

FIG. 15 is a section view through the region of a receiving cage for a multi-part retaining element, which consists of several individual elements, with a presentation of one of the individual elements while it is being inserted in the receiving cage.

FIG. 22 is a longitudinal section as in FIG. 19, however, with a connector part, which is inserted farther for the release process (section F–H according to FIG. 24).

FIG. 23 is a section E—E according to FIG. 22 for illustrating the process during the unlocking of a safety element.

FIG. 24 is a section G—G according to FIG. 22.

FIGS. 25 and 26 are partial views analogous to FIG. 22 in various positions during the removal of the connector part.

FIGS. 27 to 32 are presentations according to the FIGS. 19 to 24 in a further variation of an embodiment of the plug-in coupling according to the invention.

Figure 1:
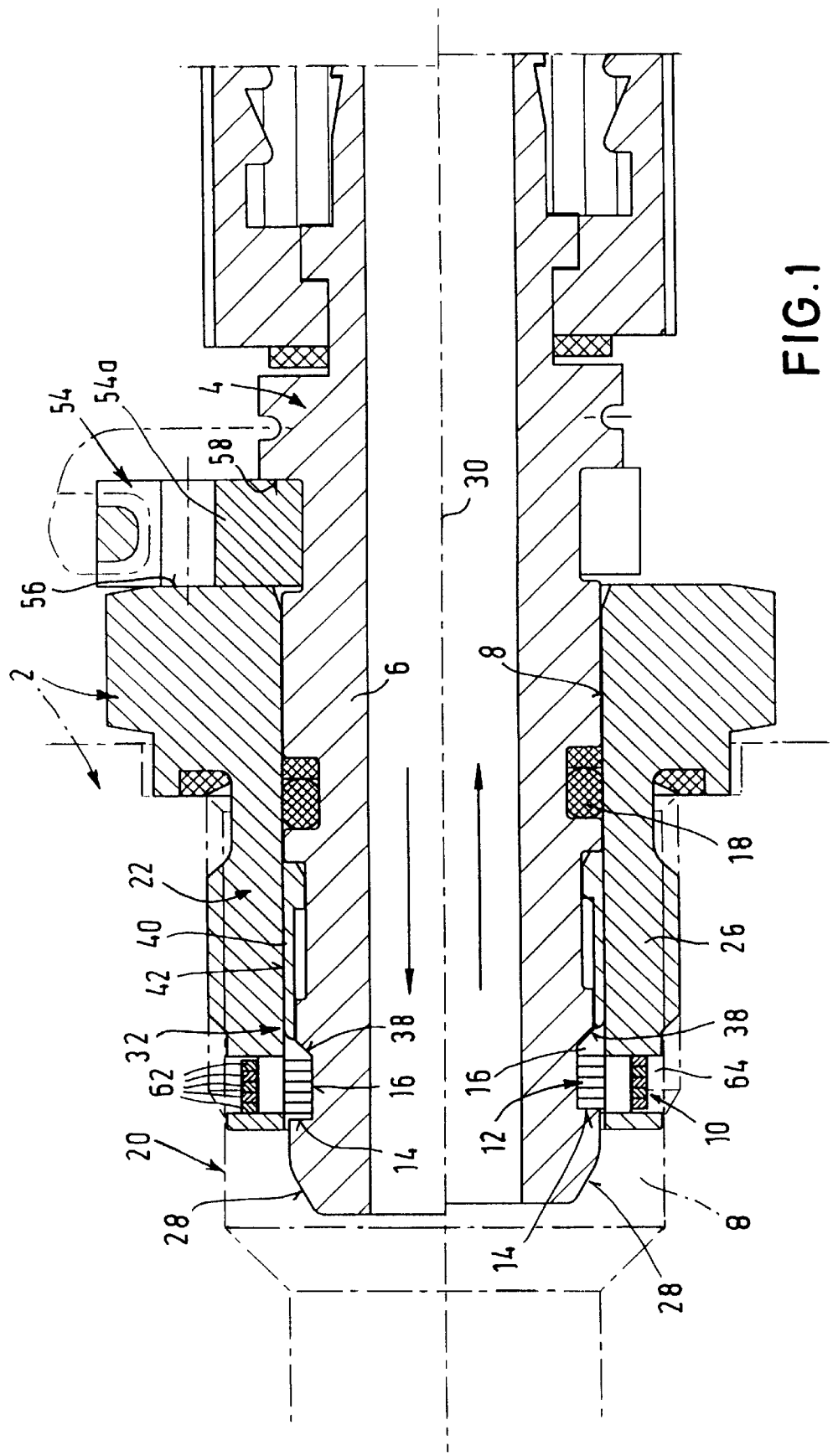
FIG. 1 is a longitudinal cross-section through a plug-in coupling according to the invention, where in the upper half of the drawing the process during the insertion of the connector part with a just completely engaged retaining element is shown, while the lower half of the drawing shows the assembly position after the application of the inner system pressure.

In the various figures of the drawing equal parts are always shown with the same reference symbol and are therefore, as a rule, always described only once.

DETAILED DESCRIPTION OF THE PREFERRED EMBODIMENT

Figure 2:
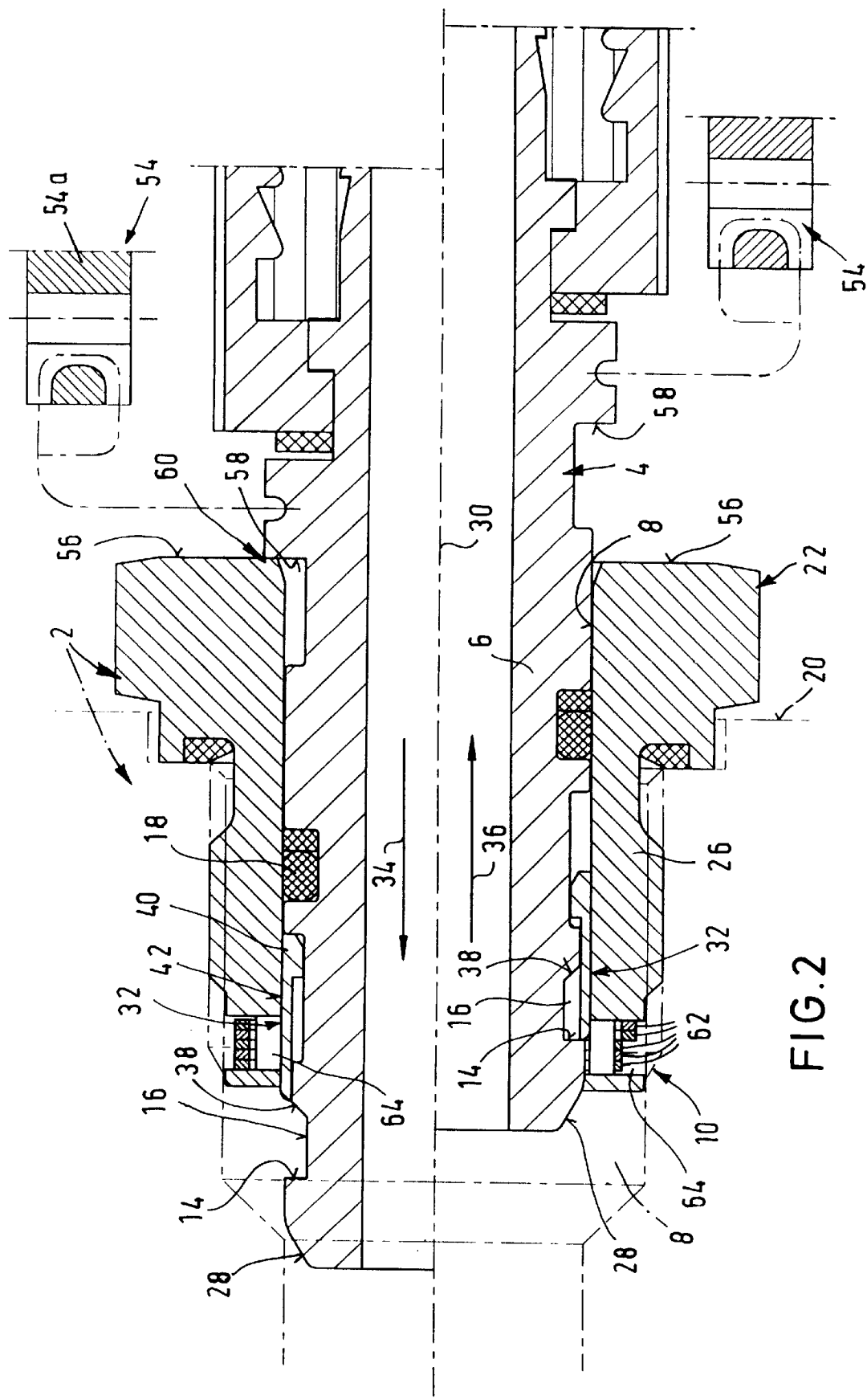
FIG. 2 is a longitudinal section analogous to FIG. 1 for illustrating the release process, where in the upper half of the drawing the condition after the unlocking of the retaining element by means of a continuing insertion of the connector part is shown, and in the lower half of the drawing the unimpeded removal movement of the connector part.

As can be seen, for example, from FIGS. 1 and 2, the plug-in coupling according to the invention consists of two coupling parts, namely a housing part 2 and a connector part 4. The connector part 4 with an essentially cylindrical connector shaft 6 is sealed around its circumference and it can be inserted into a receiving opening (8) of the housing part 2 and locked in place and kept from being released by a locking device 10, after it has been inserted. For this purpose, the locking device 10 contains preferably a retaining element 12, which can be deformed elastically in a radial direction, and which is supported on the side of the coupling part—in the example of the embodiment illustrated, of the housing part 2—and which, in order to lock the connector part 4 in place after is has been inserted, engages a locking step 14 of the other coupling part—as illustrated, that of the coupling part 4 or the coupling shaft 6, respectively—in such a manner, that it is joined to the other coupling part by means of a form-fit or a friction-and-form-fit. This condition of being locked in place is shown in FIG. 1.

Preferably the locking step 14 is formed, as in the example shown, by a groove of an outer ring, in particular one with a cylindrical surface at the base of the groove, which groove is disposed at the coupling shaft 6, retaining groove 16. In order to generate a seal along the circumference, a circumferential seal 18 is seated in a further circular groove of the connector shaft 6.

In order to ensure, above all, a simple assembly/disassembly of the retaining element 12, in the preferred embodiments the housing part 2 consists of two parts, which are connected to one another in such a manner, that they can be separated, and particularly of one arbitrary base part 20, which is only hinted at, and a closure part 22. The closure part 22 can—as shown—be constructed as an essentially hollow cylindrical insert part 26, which thus forms a portion of the receiving opening 8, and which insert part can, along a certain region, be inserted into an opening of the base part 20, for example, in the form of a male pipe fitting. In this context, there is also made reference to FIGS. 10 and 13.

In order to achieve the elastic radial spreading of the retaining element 12, which protrudes along a certain region into the receiving opening 8 and thus into the region of the cross-section of the connector shaft 6 (see also FIG. 11 for comparison), the connector part 4 has at the free end of the connector shaft 6 an outer conical surface 28. According to FIGS. 3, 5 and 8, this outer conical surface 28 forms, with the axis of insertion 30, an included cone angle β.

In order to facilitate now a simple and convenient release of the connector part 4 from its assembly position, a special release device 32 has been provided. According to FIG. 2, this release device is designed in such a manner, that, starting from the assembled condition (FIG. 1), the retaining element 12, by farther insertion of the connector part 4 in the direction of the arrow 34, can be deformed into a release position, where the retaining groove 16 can be released and thus unlocked. This position is illustrated in the upper half of FIG. 2. The release device 32 then holds the retaining element 12 in the release position in such a manner, that according to FIG. 2 lower half, the connector part 4 can be pulled unimpeded out of the receiving opening 8 in the direction of the arrow 36, without thereby causing the retaining element 12 to be able once again to be engaged by the retaining groove 16.

For this purpose, first provisions must be made, that the retaining groove 16, on its side, which is axially opposite to the locking step 14, is bounded by a cone-shaped inclined surface 38, which is deformed—as a result of the effect of the cone—by an axial insertion movement and into a shape similar to the outer cone-shaped surface 28 of the retaining element 12 for the purpose of unlocking it. Further, according to the invention there is a bushing-shaped locking bar 40 on the side of the coupling part which contains the retaining groove 16—as is shown for the connector part 4—which locking bar is guided so that it can be relatively displaced in such a manner, that the retaining element 12, when it is in the release position according to FIG. 2, can be radially superimposed on a circumferential area 42 of the locking bar 40. By this means, the retaining element 12 is forced to remain in the release position. By the movement associated with removing the connector in the direction of the arrow 36, a relative movement by means of at least a friction-fit contact between the retaining element 12 and the locking bar 40 occurs in such a manner, that the retaining groove 16 is covered by the locking bar 40 and thus closed against the engagement of the retaining element 12. Therefore, the retaining element 12, which, of course, is seated in the region of the locking bar 40, cannot engage the retaining groove 16, and instead it eventually slides completely away from the locking bar 40, when the connector part 4 is further pulled out. This process is being illustrated in FIG. 2, lower half.

It is useful to have the locking bar 40 interrupted (slotted) with a through-opening at one location in the direction of the circumference in order to facilitate ease of assembly or disassembly.

Because in the embodiment shown, the retaining element 12 is supported in the housing part 2, while the retaining groove 16 is located at the connector part 4 or at the connector shaft 6, the locking bar 40 is guided on the connector part or the connector shaft 6 in a manner permitting it to slide. By displacing it in the direction of insertion (arrow 34), the locking bar 40 is thus brought into a closure position, in which it covers the retaining groove 16 and closes it against being engaged by the retaining element 12. By a displacement in the opposite direction in accordance with the removal direction (arrow 36), the locking bar 40 is brought to its opening position, in which it opens up the retaining groove 16, so that it can be engaged by the retaining element 12.

Figure 8:
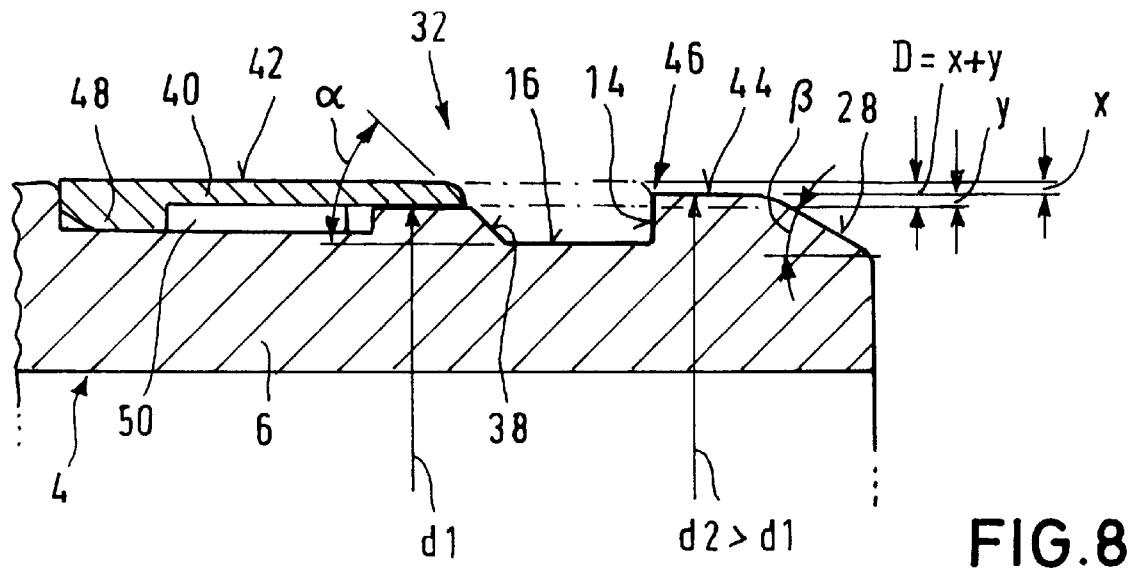
FIGS. 8 and 9 are schematic presentations analogous to FIGS. 3 or 5 for illustrating the design variations of the release device according to the invention.
Figure 9:
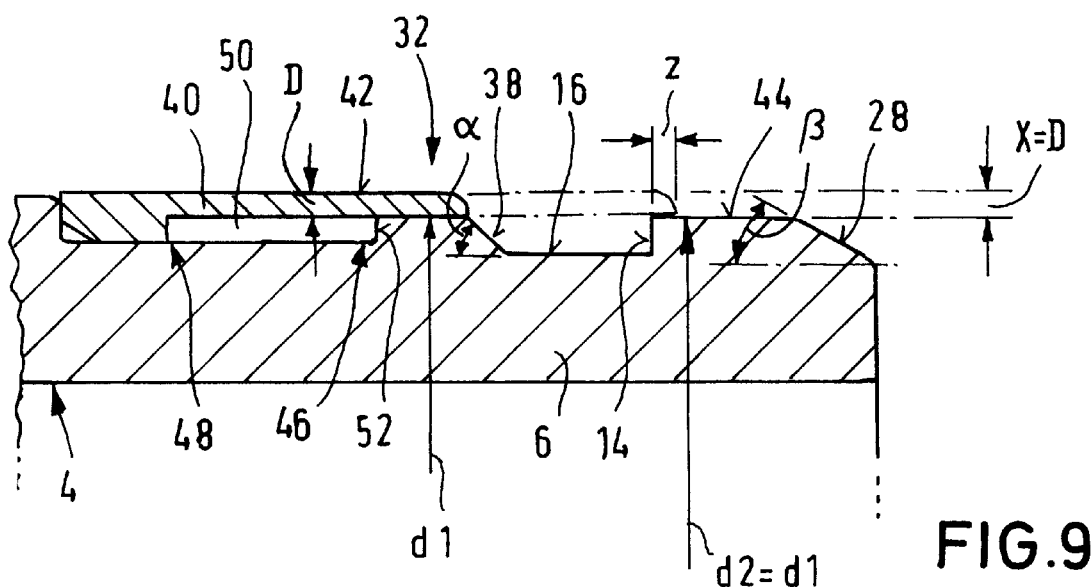

To accomplish this, it is contemplated according to FIGS. 8 and 9, that the locking bar 40, on the side facing the free end of the connector shaft 6, which end is to be inserted, protrudes beyond the outer circumferential surface 44 of the connector shaft 6 by a radial protrusion x in such a manner, that when the connector part 4 is inserted, the locking bar 40 is brought automatically, by means of its surface contact with the retaining element 12, into its opening position, where it makes the engagement possible. According to FIG. 8, the radial protrusion x is smaller than the thickness D of the locking bar 40, so that the locking bar 40 in its closure position (shown by dotted lines) makes surface contact with the locking step 14. Thus the locking step 14 in this embodiment serves as a final stop (46) for the locking bar 40.

In the alternate embodiment according to FIG. 9, the radial protrusion x corresponds to the thickness D of the locking bar 40. Furthermore, the locking bar 40 protrudes beyond the region of the retaining groove 16 in an axial direction by a protrusion z. In this embodiment, the axial final stop 46 is generated in a different way. The locking bar 40 has in its end portion, which is facing away from the retaining groove 16 in an axial direction, a radial guide shoulder 48, which points toward the inside, and which is guided by a groove-shaped guide indentation 50 of the connector shaft 6, which is adjacent the retaining groove 16 in the direction of release (arrow 34). In this way, the final stop 46 can be formed by a boundary surface 52 of the guide indentation 50, which acts jointly with the guide shoulder 48. In this case, the circumferential surfaces of the connector shaft 6 have the same diameter d1=d2 on both sides of the retaining groove 16. Contrary to this, in the case of FIG. 8 the diameter d1 in the region of the locking bar 40 is smaller than the diameter d2 in the area of the forward circumferential surface 44. The result of this is, that in the case of FIG. 9, the locking bar 40 achieves contact at the locking step 14 with a partial interior area of its thickness $D_1$ where this partial area is characterized by the letter y. From this follows that x+y=D.

As can further be seen from FIGS. 3, 5, 8 and 9, the inclined surface 38, which forms the boundary of the retaining groove 16 and which has been provided for the releasing and unlocking process, forms with the insertion axis 30 an included cone angle α. It is advantageous, to give the cone angle α a magnitude, which is different from that of the cone angle β of the forward conical surface 28. Preferably the cone angle α is greater than the cone angle β. By this means, the advantage is achieved, that the force required for the insertion is different from that required for the release, as has been illustrated in FIGS. 6 and 7. In particular, the force required for the release or the unlocking action according to FIG. 6 is greater than the force required for a normal insertion according to FIG. 7. The mechanic can thus feel a distinct difference. In the embodiment shown, the cone angle α is preferably about 45°, while the cone angle β is preferably about 30°.

According to FIGS. 1 and 2 or FIGS. 16 to 18, respectively, it is useful, if a safety element 54 is provided, in order to avoid in the assembled position (FIGS. 1 or 16, respectively, upper half), that the coupling is released unintentionally by insertion of the connector part 4. For this purpose, the safety element 54, when it is in the assembled state, can be provided between the housing part 2 and the connector part 4 in a way allowing it to be released in such a manner, that the continuing insertion movement (arrow direction 34 in FIG. 2), which is required for release, is blocked, and it is allowed to proceed only after the release or the removal, respectively, of the safety element 54. The safety element 54 can also be designed in such a manner, that instead of being disposed in such a way that it can be released, it is captive and moveable in such a manner, that after a certain (shifting) movement, e.g. a rotary movement of the safety element 54, the release is either blocked or freed.

In the example of the embodiment shown according to FIG. 1 and 2, the safety element 54 is formed by an elastic clamp or ring element 54a, which is placed—in a manner allowing it to be released—on the connector part 4 as a spacer part between the two stop surfaces 56 and 58 of the two coupling parts 2, 4. In FIG. 2 it is shown, that after the removal of the safety elements 54 the connector part 4 can be inserted in a such manner, that it can continue moving in the direction of arrow 34, until the two stop surfaces 56, 58 come in contact with it; this contact location has been identified in FIG. 2, upper half, with the reference number 60. Reaching this contact location 60, gives the mechanic a sure indication, that the unlocked and thus the fixed position of the retaining element 12 has been reached and that he, therefore, can start with the removal motion in the direction of arrow 36.

Figure 16:
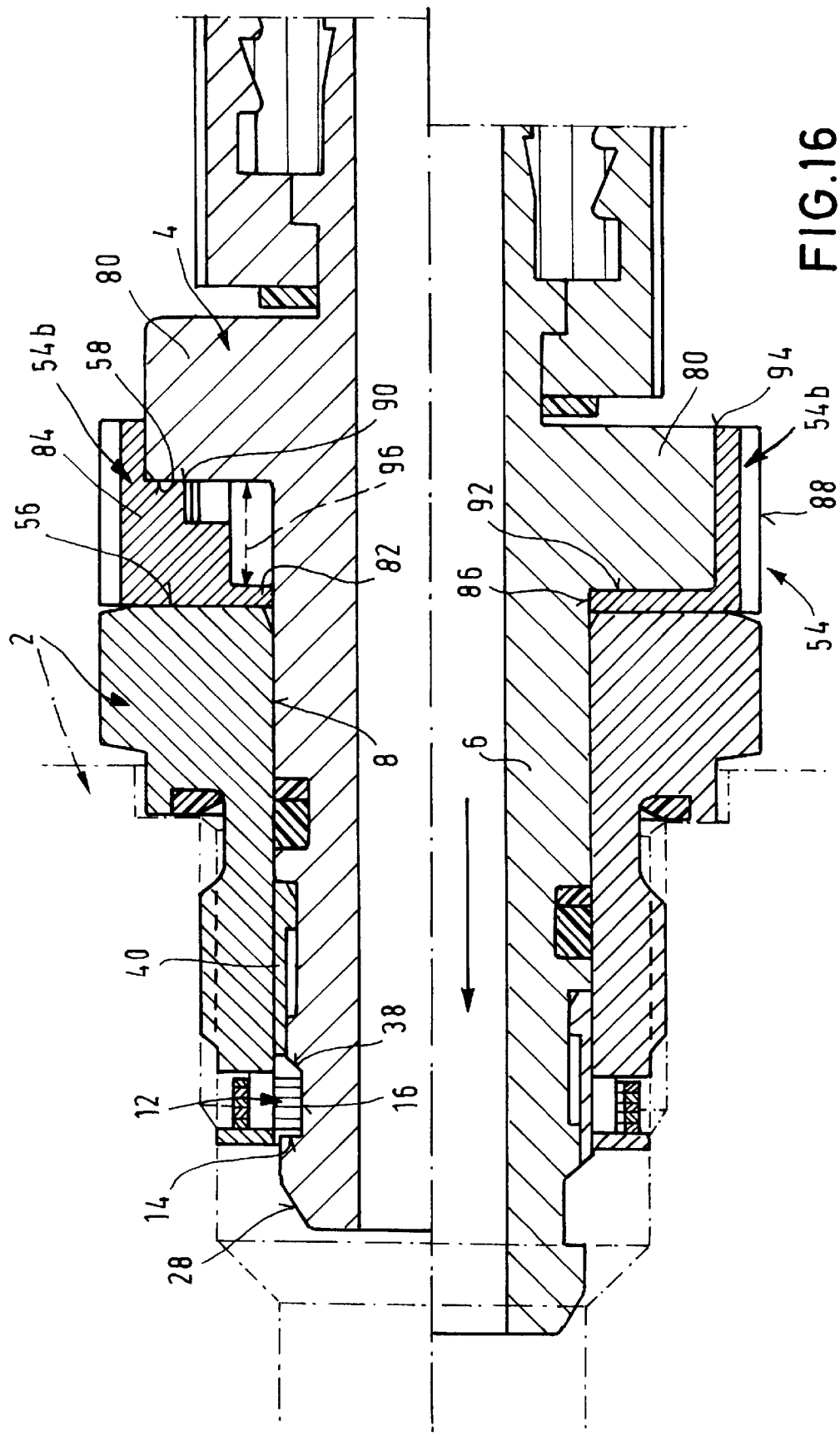
FIG. 16 is a longitudinal section through a plug-in coupling according to the invention (analogous to FIGS. 1 or 2) in an alternate embodiment with respect to a safety element, where in the upper half of the drawing a position that is secured against separation, and in the lower half of the drawing a release position have been illustrated.
Figure 18:
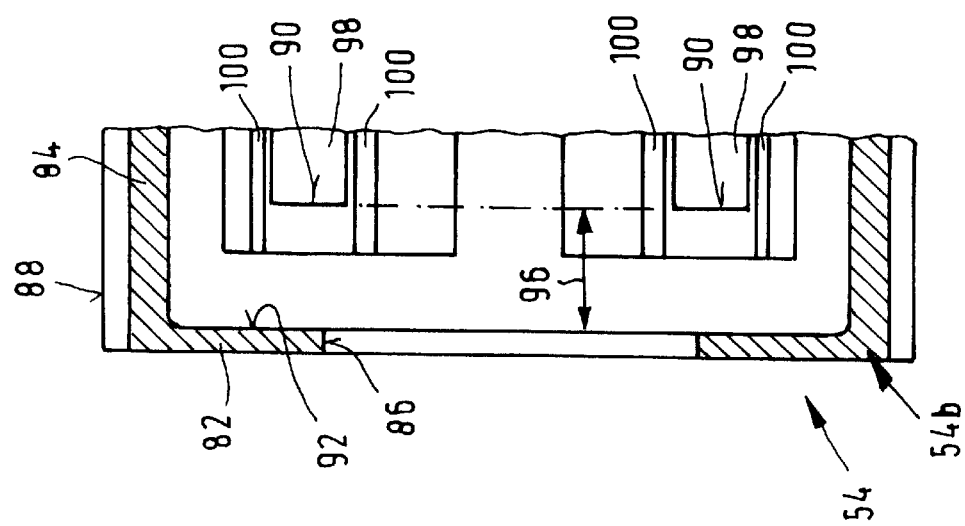
FIG. 18 is an axial section of the safety element in the cutting plane XVIII—XVIII according to FIG. 17.
Figure 17:
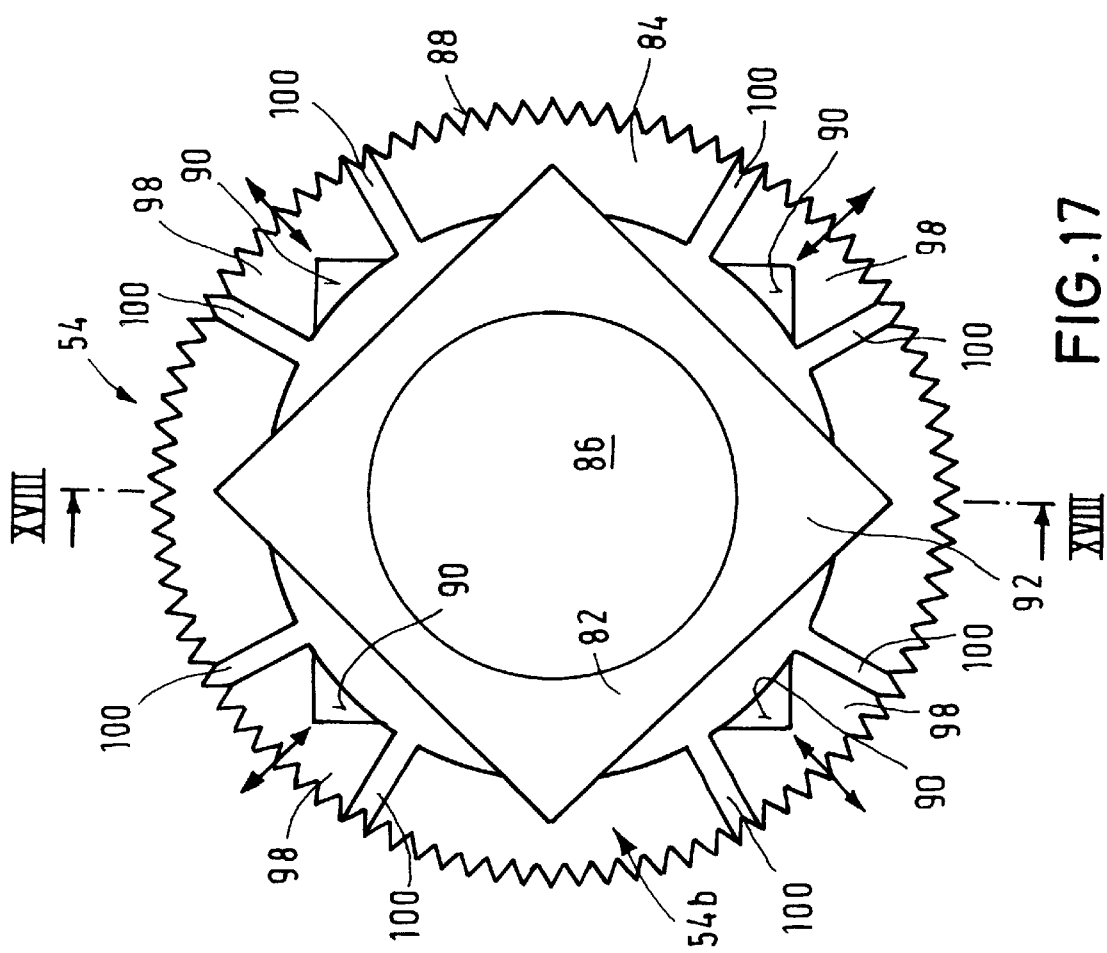
FIG. 17 is an axial view of the safety element according to FIG. 16.
Figure 21:
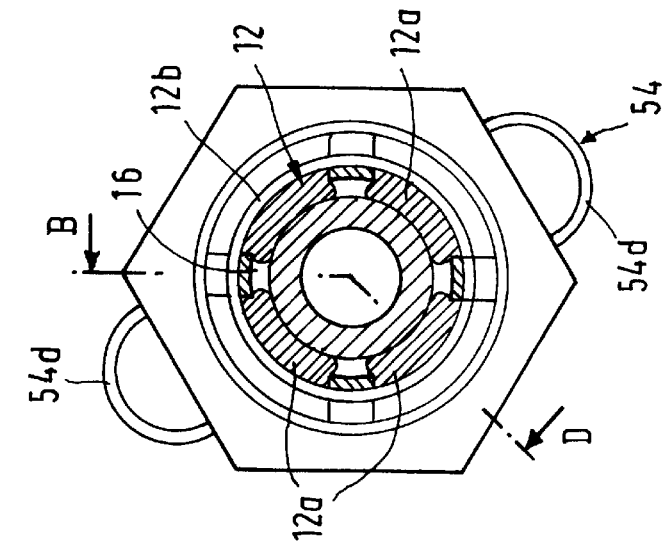
FIG. 21 is a cross section C—C according to FIG. 19.
Figure 19:
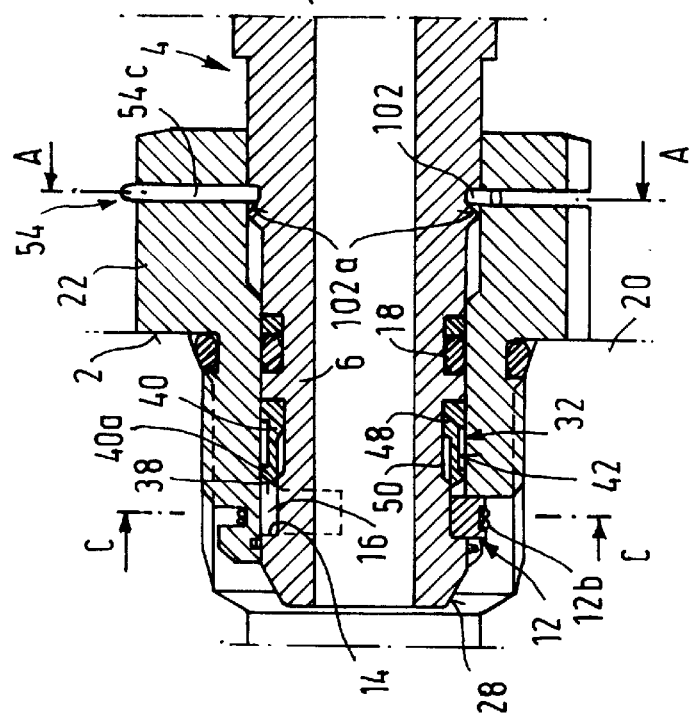
FIG. 19 is a further embodiment of the plug-in coupling according to the invention, in a longitudinal section analogous to FIG. 1, lower half of the drawing, i.e. in the assembly position (section B–D according to FIG. 21)
Figure 20:
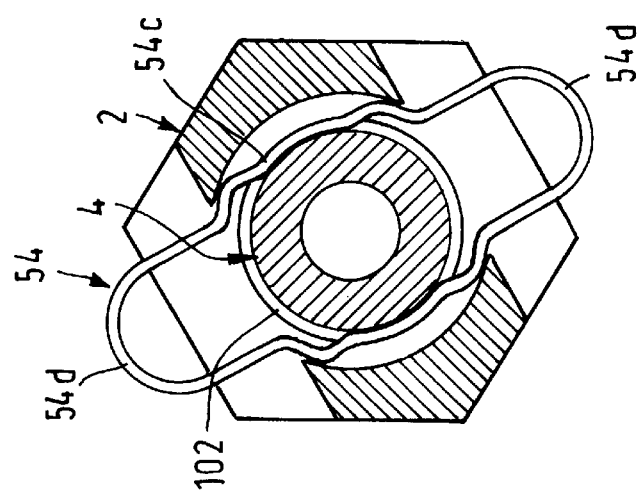
FIG. 20 is a cross section A—A according to FIG. 19.

Contrary to this according to FIGS. 16 to 18, the safety element 54 is constructed as a captive locking bar 54b, which is rotatable, in particular on the connector part 4 between the two switching positions. The stop surface 58 on the side of the connector is a part of a flange-like, radially protruding connector section 80, which has a polygonal, especially a square cross-section. The safety element 54 is somewhat cap-shaped with a bottom 82 and a circumferential wall 84. The bottom 82 has a through-opening 86 for the connector shaft 6. The circumferential wall 84 usefully contains a knurl 88 on its outer circumference. The connector section 80 engages the cap-like safety element 54, for which two different positions are possible. In a first position of relative rotation (locking position; upper half of FIG. 16), the corners of connector section 80 are seated on the first contact surfaces 90 in such a manner that the safety element 54b—similar to the safety element 54a according to FIGS. 1 and 2, which is described above—acts as a spacer part between the contact surfaces 56 and 58, in order to block the continuing insertion motion, which is necessary for the release. If the safety element 54b is rotated relative to the connector part 4 by an angle of preferably 45° into a second switching position (release position; lower half of FIG. 16), then the connector section 80 can enter further in an axial direction into a free space of the cap-like safety element 54b, until it reaches a point where it contacts a second rest surface 92. Preferably the connector section 80, in this position, should just completely fill the cap-like safety element 54b in an axial direction, i.e. the rear surfaces of the connector section 80 and the safety element 54b are lying essentially in a common plane (see the reference number 94 in FIG. 16 for comparison); this gives the mechanic now a clearly visible indication, that the release position has been reached and that he, therefore, can begin with his removal motion. According to FIG. 18, the first rest surfaces 90 are separated from the second rest surfaces 92 by an axial distance 96, which is at least equal to the displacement distance of the connector part 4 required for the unlocking process.

It is further advantageous if at least the first rest surfaces 90 are always formed at the axially extended arms 98, which can be moved radially in a spring-like elastic fashion. The arms 98 are separated from the circumferential wall 84 by axial slots 100, which are always on both sides. In this fashion, a locking action in the locked position is also ensured. The slots 100 extend in an axial direction beyond the first rest surfaces 90 in the direction of the bottom 82, in order to achieve a good elasticity of the arms 98.

In an advantageous embodiment of the invention, it is contemplated that the retaining element 12 consists of at least two individual elements 62, which are placed one behind the other when viewed from the direction of insertion, in such a manner, that during the insertion process—for a comparison to this see in particular FIG. 5—the individual elements 62 are successively radially deformed and successively, one after the other, engage the retaining groove 16 or grip the locking step 14. As becomes clear from the related diagram in FIG. 7, a relatively flat progression of the, as a whole, relatively small insertion force beyond the path of insertion is achieved. Thus a retaining element is contemplated, which is split into several individual elements—in particular four to six, which are lamella-shaped and closely spaced like packages. This leads to the result, that during the insertion process, always a relatively small force is sufficient for the radial deformation of the individual elements, and where the sum of the individual forces is also advantageously smaller than it would be in the case of a comparable one-piece retaining element. The reason for this is, that at the beginning of the insertion process at, first only one of the individual elements needs to be deformed. During the continuing insertion, the deformation of the other individual elements then takes place successively, until the first individual elements have already been engaged once more behind the locking step by means of an elastic reverse deformation, which represents an overall reduction of the insertion force. After all the individual elements have been engaged, they ensure a relatively high retaining force (due to their preferred package-like arrangement), because a good level of support of the forces, which are acting in the release direction, is collectively achieved by way of all the adjacent individual elements. By means of the "splitting" according to the invention it is further possible, to manufacture the individual elements with spring steel. Due to their relatively thin, lamella-shaped configuration, the insertion forces are also still relatively small, but a relatively high retaining force is achieved, so that the plug-in coupling according to the invention is suitable for high pressures, but can still advantageously— occasioned by the successive actuation of the individual elements—inserted by hand.

In comparison with this, an embodiment with an alternate retaining element 12 has been presented in FIG. 3, which is fashioned as a retaining element made of a one—piece block. According to the diagram in FIG. 4, the complete retaining element 12 is always elastically deformed beyond the path of insertion, which, as a whole, leads to a steeply rising and large insertion force along the entire path.

In FIG. 5, the release and unlocking process in addition to the insertion process is also being illustrated, where the individual elements of the retaining element 12 are deformed by way of the inclined surface 38 of the retaining groove 16. FIG. 6 shows the insertion force diagram related to this; by comparing it with FIG. 7 it becomes clear, that by means of the different angles α and β it has been achieved, that the insertion process is noticeably, i.e. for the mechanic clearly detectable, distinguishable from the release process, because especially the force required for the release (FIG. 6) is greater than the "normal" insertion force (FIG. 7).

It is useful, if the individual components are made as lamella-shaped clamps or spring rings, which are elastically deformable along the radius. These consist preferably of metal, especially spring steel. From two to at least six individual elements may be provided. In the preferred embodiments there may be five equally lamella-shaped individual elements, which are positioned adjacent each other, practically like a package.

It is useful to support the individual elements 62 in a receiving cage 64, where they are captive and in a position ready to be inserted.

In a first embodiment according to FIGS. 1 and 2 as well as FIGS. 10 to 12, this receiving cage 64 is an integral part of the closure part 22. The receiving cage 64 is preferably formed by a certain type of oblique slitting at the end of the insertion part 26.

In a second embodiment according to FIGS. 13 and 14, the receiving cage 64 is generated by a separate ring element 66, which, for example, may be made of plastic. This ring element is shown separately in FIG. 14. It is also similarly slit in an oblique direction, so that the individual elements 62 according to FIG. 15 can be inserted into the reception cage in a direction transverse to the axis of insertion 30 in the direction of the arrow 68 (FIG. 15). According to FIG. 13 the ring element 66 is seated usefully on a ring step 70 of the closure part 22 or the insert part 26. In the assembled condition according to FIGS. 1 and 2, the receiving cage 64 with the individual elements 62 is then seated inside the housing part 2.

As can be seen in particular in FIGS. 11 and 15, each of the individual elements 62 always usefully consists of two spring arms 74, which are connected by way of a spring joint 72 and are thus elastically moveable in a radial direction. The radial-elastic movability is shown in FIG. 11 by arrows 76. The spring joint 72 is preferably made of a connecting section, which has been made narrower between the two spring arms 74. In this region, according to FIG. 11 the individual elements 62 inside the reception cage 64 are kept in contact (contact area A in FIG. 11). The spring arms 74 themselves have an at least approximately circular contour along a region of their circumference of always about 90° which contour, in a certain area, acts jointly with the locking step 14 or the retaining groove 16 of the connector part 4. By means of this design, the spring arms 74 practically do not deform themselves even during the insertion process, but they rather move essentially by means of a deformation in the area of the spring joint 72 in the direction of the arrows 76 in FIG. 11. This described and preferred embodiment ensures very small actuation forces, due to the fact that the individual elements 62 can very easily be spread apart.

According to FIG. 15, the insertion of the individual elements 62 into the reception cage 64 takes place with the spring arms 74 remaining in front, until the spring joint 72 reaches the contact position. In order to hold the individual elements 62 in place, so that they cannot be lost, the spring arms 74 always have on their free ends a retaining step 78 in such a manner, that after insertion the retaining steps 78 act jointly with the receiving cage 64, because they are joined to it by a friction-fit and/or a form-fit. In this context, FIG. 11 and the fastening range F, which is emphasized in it, are referred to.

In the FIGS. 19 to 26 on the one hand, as well as the FIGS. 27 to 32 on the other hand, further embodiments of the plug-in coupling according to the invention are shown. Here, equal parts are given the same reference symbols and are, therefore, not explained again.

In these embodiments of FIGS. 19 to 32, there is above all the distinction that the locking bar 40 and the retaining element 12, which comes into contact along its circumferential area 42, act jointly not only by being joined by means of a friction-fit, but advantageously by being connected by a friction- and a form-fit. Thus, between these two parts 12 and 40, there is a snap-action friction- and form-fit connection, for which it is useful to equip the locking bar 40 in its circumferential area 42 with a slight radial groove, which the retaining element 12 engages in the release position. In this manner a better, i.e. safer transition of the locking bar 40 into its closure position, where it closes the retaining groove 16, is ensured. Because during the removal movement of the connector part 4 in the direction of the arrow 36 (see in particular FIGS. 25 and 26) the locking member 40 is securely held by the retaining element 12, which is joined to it by means of a friction- and form-fit, so that the retaining groove 16 is closed in any event. When the connector part 4 is pulled out further, the retaining element 12 can, according to FIG. 26, slide away from the locking bar 40 in the case of a slight radial enlargement, i.e. it can move out of the radial indentation of the groove and across one of the circular ridges or beads 40a (see in particular FIGS. 25 and 26), which form its boundary.

In this case it is additionally contemplated, that the retaining groove 16 is formed between the locking bar 40 and the boundary surface 14 of the connector part, which is located opposite the locking bar in an axial direction. The inclined surface 38, which forms a boundary with the retaining groove 16 on the other side, is thus a component part of the locking bar 40. By displacing the locking bar 40, the entire retaining groove 16 is thus reduced in size in an axial direction and finally closed or nearly filled by the locking bar 40. As a result of this, the retaining element 12 is deformed by the inclined plane 38 and pushed out of the retaining groove and into the release position.

The embodiments according to FIGS. 19 to 32 are further distinguished from the other embodiments by the type of safety element 54, which is always provided. In both cases it is fashioned as a spring clamp 54c, which is captive as well as in a position, where it is ready to provide safety during an opening of a transverse slot of the housing part 2 in such a manner, that when the connector part 4 is inserted, it engages automatically an outer circular groove 102 of the connector part 4. In this case, the spring clamp 54c is elastically deformable by means of an actuation section 54d, which is manually accessible from the outside in such a manner, that it releases the circular groove 102 of the connector part 4 for the removal or for the continuing insertion movement for the duration of this actuation which is required for the removal. An advantage of this embodiment is above all, that after the insertion of the connector part, the protection against an unwanted release is ensured, because the spring clamp 54c, when it is in the not actuated condition, always automatically, as a result of the spring force, assumes the position, in which it is ready to provide safety. This protection is, therefore, no longer dependent on a certain activity by the personnel using it. Because of its captive mounting, the safety element 54 remains always a component part of the plug-in coupling according to the invention (very low risk of having it get lost).

In order to release the connector part 4 or for the continuing insertion movement required for it, it is, therefore, merely necessary to actuate the spring clamp 54c for a short time, so as to achieve the release of the circular groove 102. In this manner, the connector part 4 can be inserted in order to unlock the retaining element 12, and it can then be removed. During this removal movement, the spring clamp 54c could, in principle, again engage the circular groove 102, provided the spring clamp 54c is no longer being actuated. In order to achieve that the connector part 4 really can be removed without a renewed actuation of the spring clamp 54c, there is a preferred provision, where the outer circular groove 102 of the connector part 4 is bounded by a conical surface 102a on its side facing the direction of insertion. In this case in particular, a chamfer of about 45° is involved. By way of this conical surface 102a, the engaged spring clamp 54c is forced to the outside by the removal movement, so that the connector part 4 can be removed. This design represents a particular safety aspect, because the safety element 54 alone, i.e. without the retaining element 12, cannot serve to lock the connector part 4 in place.

As far as the embodiment in particular is now concerned, the spring clamp 54c in the design according to FIGS. 19 to 24 is formed by a piece of spring wire, which is essentially bent into an oval shape. According to FIG. 20, the longer sides of the oval are formed in such a way that they automatically engage the circular groove 102 in an approximately tangential direction. By manual pressure on the narrow sides of the oval according to FIG. 23, the longitudinal sides can be spread apart and away from each other and thus moved out of the circular groove 102.

In the case of the embodiment according to FIGS. 27 to 32, the spring clamp 54c involves an essentially ring-shaped molded ring made of plastic, which in one region of its ring circumference contains through-slots and which can, therefore, be elastically deformed in a radial direction. Such a ring with spring elasticity is—as a basic retaining element—known in principle, for which one may refer, for example, to the DE-C-25 47 411 as well as to the DE-C-27 17 908. This spring ring is disrupted at one place by a radial slot, particularly one having the shape of a labyrinth, and it contains two spring arms, which are molded as part of it and which originate approximately in the region of the radial slot and proceed as circles and approximately coaxially and form, with their free ends, the actuating sections 54d. By compressing these actuating sections 54d in the direction of the arrows shown in FIG. 31, the plastic molded ring can be spread apart until it releases the connector-circular groove 102.

It should also be mentioned, that in the case of the embodiments according to FIGS. 19 to 32 as well, the locking bar 40 with the guide shoulder 4b is guided in a groove-shaped guide indentation 50. However in this case, this guide indentation 50 changes directly into the region of the retaining groove 16.

Finally, in the embodiments according to FIGS. 19 to 32 still another kind of retaining element 12 is used. In this case, it is ring-shaped and formed by several (here for example four) individual ring segments 12a, where these ring segments 12a are acted upon by a concentric spring ring element 12b in such a manner, that the ring segments 12a—which themselves are preferred to be essentially rigid and dimensionally stable—are always moveable in a radial direction. Details of this are contained in the German patent application 197 22 039.8, which will be referred to fully.

The invention is not limited to the preferred examples of embodiments shown, but also includes all embodiments, which act equally within the scope of the invention.

Thus the invention is basically also suited to an embodiment, in which the retaining element 12 is pre-installed on the connector part 4 and which—during the insertion process—is radially deformed toward the interior by way of an interior cone of the housing part, until it is engaged by a corresponding locking step of the housing part. In this case it would be necessary to store the locking bar 40 inside the housing part. The claims 13 and 14 are being referred to.

Otherwise the invention is still not limited to the combination of characteristics defined in the main claim, but it can also be defined by any other arbitrary combination of certain characteristics of all the disclosed individual characteristics. This means, that in principle practically every individual characteristic of claim 1 can be left out or be replaced by at least one individual characteristic disclosed in another part of the application. In this respect claim 1 is merely to be understood as a first attempt of a formulation of an invention.

We claim:

1. A plug-in coupling for systems involving pressurized media, where the coupling comprises two coupling parts including a housing part (2) and a connector part (4), where the connector part (4) is inserted into a receiving opening (8) of the housing part (2), while it is being sealed, and when it is in a plugged-in position, it is locked in place and prevented from being released by means of a locking device (10), and where the locking device (10) includes a retaining element (12), which is supported by of one of the coupling parts, and which retaining element engages a retaining groove (16) of the other coupling part by means of a form-fit and where a release device (32) is provided in such a manner, that the retaining element (12) is brought into a release position by means of a further insertion of the connector part (4), in which position the retaining groove (16) is released and the connector part (4) is removable from the receiving opening (8), the release device (32) is equipped with a sleeve-type locking bar (40) on the one of the coupling part which contains the retaining groove (16), wherein an inclined surface defines one side of the retaining groove, where the sleeve type locking bar is actuated by movement of the connector part (4) and which is to be used in conjunction with the retaining groove (16) in such a manner, that the retaining element (12) is moved up the inclined surface and, when it is in the release position, is brought into radial contact with a circumferential area (42) of the locking bar (40) and is thus held in the release position, and when the movement to remove the plug-in connector takes place, the locking bar (40) is moved into the region of the retaining groove (16) in such a manner, that a radial engagement of the retaining element (12, 12a, 12b) of the retaining groove (16) is prevented.

2. Plug-in coupling according to claim 1, wherein the retaining element (12) is formed in such a way that it is elastically deformed by way of the inclined surface (38) in a radial direction and that, in the assembly position, it engages the retaining groove (16) with its entire length or thickness as measured in the axial direction, while the axial thickness of the retaining element (12) is approximately equal to the axial length of the retaining groove (16).

3. Plug-in coupling according to claim 1 wherein the retaining element is supported by the housing part (2), while the connector part (4) includes portions defining the retaining groove including said inclined surface which comprises a conical surface for the radial deformation of the retaining element.

4. Plug-in coupling according to claim 3, wherein the locking bar is moveable and disposed on the connector part (4) in such a manner, that it is brought into an opening position by a displacement in the direction of insertion (34), where it frees the retaining groove for engaging the regaining elements and where it is brought into a closure position by a displacement in the direction of the release (36), where it closes the retaining groove against being engaged by the retaining element, which comes into contact with said looking bar with its interior circumferential surface.

5. Plug-in coupling according to claim 1, wherein a safety element (54), located between the housing part (2) and the connector part (4), which is released when it is in the assembled state, in such a manner that the continuing insertion movement of the connector part (4), which is intended to release it, is blocked and is released only after the release of the safety element (54).

6. Plug-in coupling according to claim 5, wherein the safety element (54) is formed by an elastic clamp.

7. Plug-in coupling according to claim 5, wherein the safety element (54) is a ring element (54b), which can be switched between an engaged position and a released position, the released position allowing the continuing insertion movement of the connector part.

8. Plug-in coupling according to claim 1, wherein the retaining element (12) is made in the form of rings consisting of several individual ring segments (12a), where the ring segments (12a) are acted upon by a concentric circular spring element (12b) with a radically acting spring force.

9. Plug-in coupling according to claim 1, wherein the housing part (2) consists of two detachably connected parts, comprising a base part (20) and a closure part (22), which jointly with the retaining element (12) receives the base part (20), while the closure part (22) is constructed as an essentially hollow, cylindrical insert part (26), which can be inserted in a certain region into an opening of the base part (20), and where the insert part (26) is connected to the base part (20) by means that can be released.

10. Plug-in coupling according to claim 1, wherein that the locking bar (40) and the retaining element (12), which comes in contact with its circumferential surface (42), act in concert by being joined by means of a friction—and form-fit.

11. Plug-in coupling according to claim 1, wherein the sleeve type locking bar includes the inclined surface and the inclined surface defines, at least in part, one side of the retaining groove within which the retaining element is received.

* * * * *

UNITED STATES PATENT AND TRADEMARK OFFICE
CERTIFICATE OF CORRECTION

PATENT NO. : 6,231,084 B1
DATED : June 14, 2001
INVENTOR(S) : Hester et al.

It is certified that error appears in the above-identified patent and that said Letters Patent is hereby corrected as shown below:

Claim 1,
Line 9: delete "by", insert -- on one side --

Signed and Sealed this

Eighteenth Day of September, 2001

Attest:

*Nicholas P. Godici*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO.     : 6,231,084 B1
DATED          : May 15, 2001
INVENTOR(S)    : Hester et al.

It is certified that error appears in the above-identified patent and that said Letters Patent is hereby corrected as shown below:

<u>Column 14,</u>
Line 12, delete "said inclined surface which comprises a" and insert -- an interior --
Line 24, delete "said looking bar with"
Line 49, after "while the closure part is", insert -- preferably --

Signed and Sealed this

Thirteenth Day of November, 2001

Attest:

NICHOLAS P. GODICI
Attesting Officer    Acting Director of the United States Patent and Trademark Office